United States Patent [19]
Volz et al.

[11] Patent Number: 5,853,017
[45] Date of Patent: Dec. 29, 1998

[54] CLOSING DEVICE FOR CLOSING PRESSURE FLUID CONVEYING CHANNELS IN A HOUSING

[75] Inventors: Peter Volz, Darmstadt; Helmut Weisbrod, Bad Nauheim; Jochen Burgdorf, Offenbach; Werner Volkmar, Idstein, all of Germany

[73] Assignee: ITT Manufacturing Enterprises Inc., Wilmington, Del.

[21] Appl. No.: 817,448

[22] PCT Filed: Oct. 17, 1995

[86] PCT No.: PCT/EP95/04068

§ 371 Date: Jul. 29, 1997

§ 102(e) Date: Jul. 29, 1997

[87] PCT Pub. No.: WO96/14537

PCT Pub. Date: May 17, 1996

[30] Foreign Application Priority Data

Nov. 2, 1994 [DE] Germany .......................... 44 39 059.9

[51] Int. Cl.⁶ .................................................... F16K 31/06
[52] U.S. Cl. ........................ 137/1; 251/129.15; 29/890.13
[58] Field of Search .......................... 137/1; 251/129.01, 251/368, 129.15; 29/890.13, 890.132, 890.124

[56] References Cited

U.S. PATENT DOCUMENTS

| | | | |
|---|---|---|---|
| 4,460,541 | 7/1984 | Singleton et al. | 419/42 |
| 4,489,916 | 12/1984 | Stevens | 251/214 |
| 4,631,095 | 12/1986 | von Hagen et al. | 148/12 F |
| 5,333,836 | 8/1994 | Fukuyo et al. | 251/129.15 |
| 5,626,326 | 5/1997 | Goossens et al. | 251/129.15 |
| 5,653,249 | 8/1997 | Reinartz et al. | 251/129.15 X |

*Primary Examiner*—Kevin Lee
*Attorney, Agent, or Firm*—J. Gordon Lewis; Thomas N. Twomey

[57] ABSTRACT

The present invention relates to a closing device for closing pressure fluid conveying channels in a housing by a closing member press fitted into a channel, the outside periphery of the closing member including at least one indentation into which, by press fitting the closing member into the channel, basic material of the housing is deformed to provide a form lock. The housing is made of a malleable aluminum alloy, and the closing member is made of steel.

15 Claims, 1 Drawing Sheet

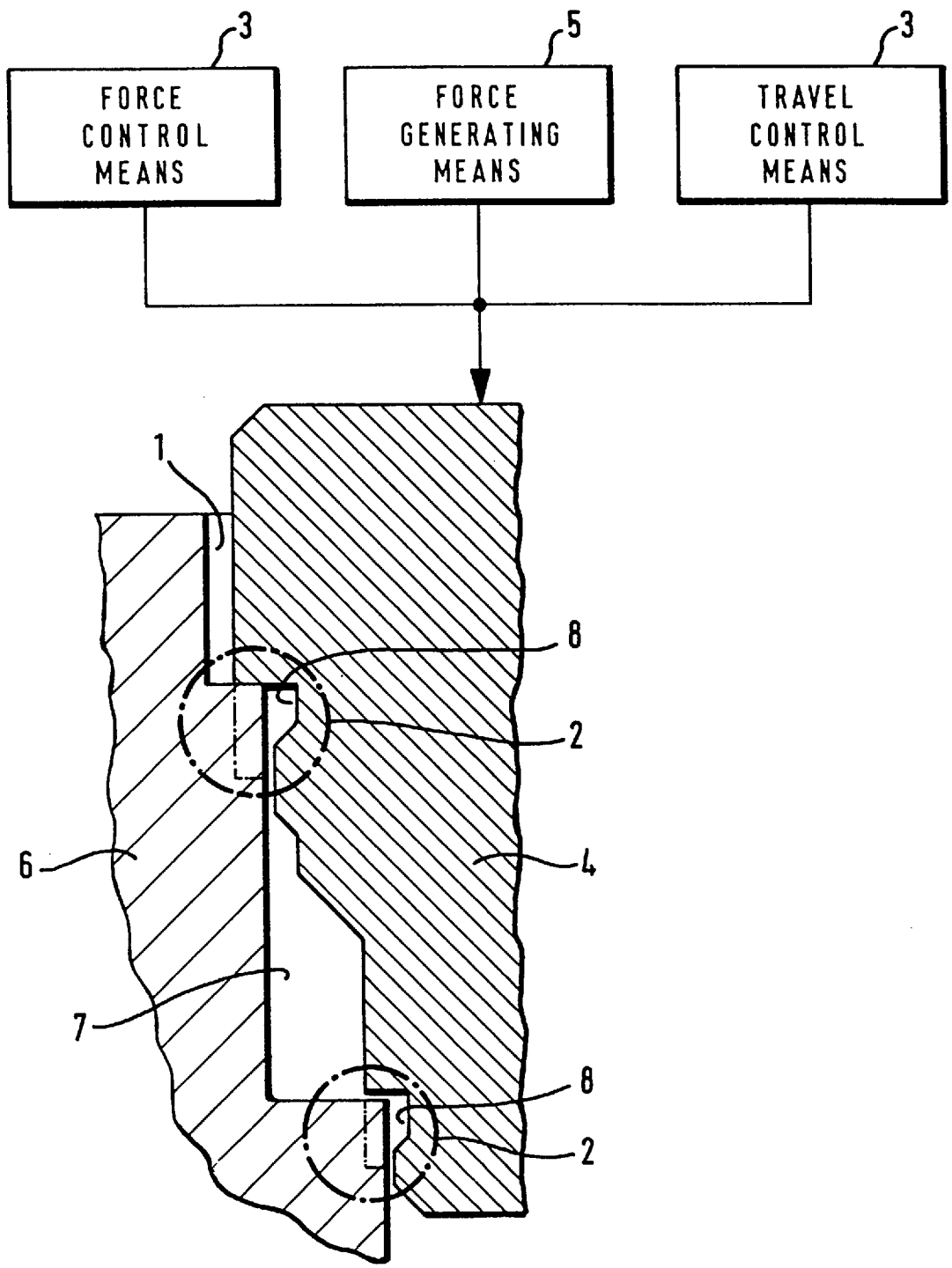

5,853,017

CLOSING DEVICE FOR CLOSING PRESSURE FLUID CONVEYING CHANNELS IN A HOUSING

TECHNICAL FIELD

The present invention relates to a closing device for closing pressure fluid conveying channels in a housing, the outside periphery of the closing member including at least one indentation into which, during press fitting the closing member into the channel, basic material of the housing is deformed to provide a form lock.

BACKGROUND OF THE INVENTION

German utility model No. 87 16 060 discloses a closing device for closing bores or channels in which pressure fluid is conveyed. The closing device has a positive connection with the housing by a closing member pressed into a stepped bore. The basic material of the stepped bore, which provides the form lock, is plastically deformed into an indentation between two piston portions on the closing member which correspond to the two bore portions. The closing member is thereby fastened and sealed in the housing bore.

OBJECT OF THE INVENTION

Therefore, an object of the present invention is to provide a closing device of the generic type so that a particularly reliable attachment and sealing of the closing member in the housing is achieved by incurring low manufacturing costs. Another object is to indicate a suitable method of monitoring the press-in operation of the closing member into the housing.

SUMMARY OF THE INVENTION

According to the present invention, this object is generally achieved by a housing which is made of a malleable aluminum alloy and a closure member which is made of steel, wherein with respect to the method of monitoring the closing of a pressure fluid connection by such a closing member, the press-in force applied when the closing member is forced into the housing is measured, monitored and evaluated as a function of the travel covered by the component that is forced in.

The material composites silicon, iron, copper, manganese, magnesium, chrome, zinc and titanium take great influence on the material properties of the housing. A certain quantity of each of these chemical elements is provided in a mass ratio which determines the deformability and machineability of the housing.

To permit ease of machining the steel by turning, milling, drilling and chip detaching operations, to render the steel mechanically resistant, and to provide a durable hydraulic seal-tightness of the steel, a chemical compound is proposed which determines the above mentioned material properties in the steel within defined quantity limits.

To satisfy the requirements imposed on the materials of the housing and the closing member, the steel is specified in terms of its necessary physical properties by tension tests. To this end, the appropriate characteristic quantities of the materials used are a yield strength of at least $520N/mm^2$ for the steel and at least 230 to $330N/mm^2$ for the aluminum, a tensile strength of at least $520N/mm^2$ to $650N/mm^2$ for the steel, and at least 310 to $380N/mm^2$ for the aluminum.

To judge whether the material values of the chosen closing device are appropriate for the desired deformability and machineability, which are attained by rather soft to medium-hard materials, a Brinell test of hardness is applied.

Preferably the malleable square bar of aluminum alloy which is hot-pressed, thermally treated and straightened. This permits qualities of use of the semifinished products which are in conformity with the demands of manufacture and performance.

In a favorable aspect of the present invention, the material structure of the steel is made up of a ferritic basic material in which perlite is laminated. Mechanical treatment of the steel to achieve the shape of the closing member is thereby facilitated.

An appropriate method of monitoring the operation of forcing the closing member into the housing is represented by measuring the press-in force as a function of the travel covered by the component which is press fitted. This method permits a simple monitoring and documentation, reduced in terms of cost and time, of manufacture and permits reliably determining dimension errors, physical properties and the press-in depth.

Further objectives, features, advantages and possible applications of the present invention can be seen from the following description of an embodiment, making reference to the accompanying drawing. All features described and/or illustrated per se, or in any suitable combination desired, represent the subject matter of the present invention, irrespective of their combination in the claims or their appendency.

BRIEF DESCRIPTION OF THE DRAWING

FIG. 1 is a schematic partial view of a closing device according to the invention.

DETAILED DESCRIPTION OF THE INVENTION

FIG. 1 disclose a closing device including a closing member which has a generally plug-shaped cross-section. The closing member is attached in a stepped bore of the generally block-shaped housing 6 by self-clinched engagement. The point of self-clinched engagement 2 indicated between the housing bore and the closing member 4 is provided by the material of housing 6 which is plastically deformed into an indentation 8 in the closing member 4. On either side of the indentation 8, the closing member 4 has piston portions of differently large diameters, which are correspondingly adapted to the outside bore portion 1 and the inside bore portion 7. During press fitting the closing member 4 into the stepped bore, the piston portions support the deformation of the housing material into the indentations 8. The indentations 8 are compatible with a cavetto-type recess on the periphery of the closing member 4 which provides a metallic seal besides the generation of a retaining force. The indentations 8 in the closing member 4 may be freely chosen to a limited extent in terms of their geometry. According to the present invention, the closing member 4 is made of steel, preferably of cold-drawn free-cutting steel, with the result that the shape cutting operation of the closing member 4 is facilitated. The closing member 4 can be machined without difficulties by turning, milling and drilling. The chemical composition of the closing member 4 which must be permanently fluid-tight includes, within defined limits of quantity, portions of carbon, silicon, manganese, phosphorus, sulphur, lead and nitrogen ranging from 0 to 1.25% when named in percents in mass for each of the elements. Manganese reaches the maximum percentage. All other elements mentioned range between 0.04 and 0.33% of their mass share in the chemical composition of the steel. To increase the metal cutting capacity and to improve the surface smoothness of the closing member 4, the described steel should be alloyed with tellurium and bismuth, if necessary. The share in percent in the chemical composition of the steel should not exceed 0.02% for tellurium and 0.08% for bismuth. The mechanical physical properties of the steel, as required, are thereby achieved and permit a yield strength and tensile strength of at least 520N/mm$^2$. The elongation at rupture of the steel in the above mentioned composition of the chemical elements reaches numerical values which are in excess of 8%. The Brinell hardness of the cold-drawn semifinished product amounts to at least 160 HB. The indicated strength values of the steel relate to round bar material for the closing member 4 with a diameter of at least 15 mm. Laminated perlite is included in the ferritic basic structure of the steel melt for the closing member 4. Possible inclusions of manganese, sulphides and lead should be minimized and are permitted only in a very fine distribution. Rows of lead are not permitted.

The housing 6 made of a malleable aluminum alloy is preferably manufactured from a square bar material. The square bar material is hot-pressed, thermally treated and straightened for being used for pneumatic and hydraulic blocks and for pump housings. A suitable machineability by milling and drilling and the condition for plastic deformation and seal-tightness of the housing necessary for the self-clinched engagement 2 is influenced by the respective percent mass content of the individual elements silicon, iron, copper, manganese, magnesium, chromium, zinc and titanium in the chemical composition of the malleable aluminum alloy, limited to a value of 1.2 percent for the mentioned elements. In particular, each of the mass shares of the individual elements, such as manganese, copper, chromium, zinc and titanium is considerably below the limit value of 1.2%.

This provides the housing 6 with the necessary mechanical properties which achieve a yield strength between 230 and 330N/mm$^2$ and a tensile strength between 310 and 380N/mm$^2$. The breaking tension of the malleable aluminum alloy roughly amounts to 12%. The values for the mechanical properties achieved transversely to the pressing direction may range up to 15% below the above mentioned values in the longitudinal direction of the square bar. The Brinell hardness of the housing 6 in the core of the square bar amounts to at least 90 to 110 HB with a load factor equal to ten.

The operation of forcing the closing member 4 into the housing 6 is monitored by a method which identifies possible dimension errors and discrepancies from the predetermined material specifications. This is simply done by monitoring by way of measurements a press-in force applied by a force generating means 5 to the closing member 4 in dependence on the travel covered by the component to be forced in (closing member 4). The pickups of measuring data 3 (force control means, travel control means) required to this end are not included in the contents of the monitoring method disclosed in the present invention. Therefore, functional and structural details of the pickups for measuring data 3 are not referred to. The travel and the press-in force determined by measurements, as a force-travel function, will then be continuously monitored with respect to characteristic features, such as slope and points of discontinuity of a characteristic curve made up of the force-travel function. To monitor the press-in operation, tolerance zones for the force variation or travel variation are fixed which permit a qualitative evaluation of the press-in operation in the simplest case.

Thus, a highly resistant closing device for closing bores and channels that convey pressure fluid is achieved by the disclosed features relating to material processing and industrial engineering. The need for separate sealing and retaining arrangements is thereby obviated. The present invention is preferably used for pneumatic and hydraulic assembly units of automotive vehicle brakes.

We claim:

1. A Closing device for closing pressure fluid conveying channels in a housing by a closing member that is press fitted into a channel, the closing member having an outside periphery including at least one indentation into which basic material of the housing is deformed during press fitting the closing member into the channel to provide a form lock, wherein the channel is configured as a stepped bore having an outside bore portion of large diameter that is remote from a pressure fluid side, the outside bore being followed through a step by an inside bore portion of smaller diameter that is close to the pressure fluid side, wherein the closing member has two piston portions of diameters that respectively correspond to the diameters of the inside and outside bore portions, and the indentation provided between the piston portions is undercut relative to the inside bore portion, and the basic material is press fitted by plastic deformation into the indentation to provide the form lock, an amount of press-in force applied to the closing member being continuously measured by force control means and adjusted as a function of a measurement of a distance traveled by the closing member, wherein the principal constituent of the housing is aluminum and the closing member is made of steel.

2. A Closing device as claimed in claim 1, wherein the housing comprises a malleable aluminum alloy including at least one of the chemical elements selected from the group consisting of silicon, iron, copper, manganese, magnesium, chromium, zinc, and titanium.

3. A Closing device as claimed in claim 1, wherein the steel includes at least one of the chemical elements selected from the group consisting of carbon, silicon, manganese, phosphorus, sulfur, lead, and nitrogen.

4. A Closing device as claimed in claim 1, wherein the yield strength of the steel in the pressing direction is at least 520N/mm$^2$, and the yield strength of the aluminum is between 230 and 330N/mm$^2$.

5. A Closing device as claimed in claim 1, wherein the tensile strength of the steel in the pressing direction is at least 520N/mm$^2$, and the tensile strength of the aluminum is between 310 to 380N/mm$^2$.

6. A Closing device as claimed in claim 1, wherein the breaking tension of the steel in the pressing direction is at least 8%.

7. A Closing device as claimed in claim 4, wherein the yield strength, tensile strength, and breaking tension in the aluminum transversely to the pressing direction are up to 15% below their respective values in the longitudinal direction.

8. A Closing device as claimed in claim 1, wherein the Brinell hardness of the aluminum is between 90 HB and 110 HB, and the Brinell hardness of the steel is at least 160 HB, the Brinell hardness of the aluminum being determined with a load factor equal to 10 in the structure core.

9. A Closing device as claimed in claim 1, wherein the aluminum of the housing is formed of a hot-pressed, thermally treated, and straightened square bar.

10. A Closing device as claimed in claim 1, wherein the material structure comprises a ferritic basic material in which perlite is laminated.

11. A Method of closing pressure fluid conveying channels in a housing by a closing member that is to be press fitted into a channel, of the closing member having an outside periphery including at least one indentation into which basic material of the housing is deformed during press fitting the closing member into the channel to provide a form lock,
  wherein the channel is configured as a stepped bore having an outside bore portion of large diameter that is remote from a pressure fluid side, the outside bore being followed by an inside bore portion of smaller diameter that is close to the pressure fluid side,
  wherein the closing member has two piston portions of diameters that respectively correspond to the diameters of the inside and outside bore portions, and the indentation provided between the piston portions is undercut relative to the inside bore portion, and the basic material is press fitted by plastic deformation into the indentation to provide the form lock, the method comprising:
    continuously measuring an amount of press-in force applied to the closing member using a force control arrangement;
    measuring a distance traveled by the closing member; and
    using the force control arrangement to adjust the amount of press-in force applied to the closing member as a function of the measured distance traveled.

12. A Method as claimed in claim 11, further comprising:
  calculating, based on the measured applied press-in force and distance, a force-travel function having characteristic features; and
  evaluating the measured press-in force and the distance traveled with respect to the characteristic features of the force-travel function.

13. A Method as claimed in claim 12, further comprising monitoring the press-in operation of the closing member by comparing the force-travel function with travel tolerance zones predetermined by measurements.

14. A Method as claimed in claim 11, further comprising monitoring the press-in operation of the closing member by comparing the force-travel function with force tolerance zones predetermined by measurements.

15. A Method as claimed in claim 11, further comprising monitoring and evaluating a characteristic curve variation defined by force-travel functions for each of a plurality of self-clinched engagements provided on the outside bore portion with respective time delays by respective indentations serially disposed along the closing member.

* * * * *